United States Patent
Kunimatsu et al.

(10) Patent No.: US 10,254,590 B2
(45) Date of Patent: Apr. 9, 2019

(54) DISPLAY DEVICE

(71) Applicant: Japan Display Inc., Minato-ku (JP)

(72) Inventors: Noboru Kunimatsu, Tokyo (JP); Toshiyuki Higano, Tokyo (JP); Midori Tsukane, Tokyo (JP); Kazuhiro Nishiyama, Tokyo (JP)

(73) Assignee: Japan Display Inc., Minato-ku (JP)

( * ) Notice: Subject to any disclaimer, the term of this patent is extended or adjusted under 35 U.S.C. 154(b) by 186 days.

(21) Appl. No.: 15/076,194

(22) Filed: Mar. 21, 2016

(65) Prior Publication Data
US 2016/0282647 A1    Sep. 29, 2016

(30) Foreign Application Priority Data
Mar. 27, 2015 (JP) .................. 2015-066402

(51) Int. Cl.
G02F 1/1339    (2006.01)
G02F 1/1337    (2006.01)

(52) U.S. Cl.
CPC .......... *G02F 1/1339* (2013.01); *G02F 1/1337* (2013.01); *G02F 1/13394* (2013.01); *G02F 2001/13396* (2013.01); *G02F 2001/13398* (2013.01)

(58) Field of Classification Search
CPC ............. G02F 1/1339; G02F 1/133723; G02F 1/13394; G02F 2001/13396; G02F 2001/13398
See application file for complete search history.

(56) References Cited

U.S. PATENT DOCUMENTS

| 5,717,475 | A | 2/1998 | Kamio et al. | |
|---|---|---|---|---|
| 2002/0063839 | A1* | 5/2002 | Matsumoto | G02F 1/1339 349/156 |
| 2009/0053430 | A1 | 2/2009 | Matsumori et al. | |
| 2009/0093562 | A1* | 4/2009 | Tanikawa | C08F 290/06 522/44 |
| 2010/0149477 | A1* | 6/2010 | Nagami | G02F 1/1339 349/138 |
| 2012/0033162 | A1* | 2/2012 | Ahn | G02F 1/1339 349/106 |
| 2012/0075559 | A1* | 3/2012 | Sonoda | G02F 1/1339 349/110 |

(Continued)

FOREIGN PATENT DOCUMENTS

| JP | 8-201837 | 8/1996 |
|---|---|---|
| JP | 2001-141907 | 5/2001 |

(Continued)

*Primary Examiner* — Michael H Caley
*Assistant Examiner* — Jonathan Y Jung
(74) *Attorney, Agent, or Firm* — Oblon, McClelland, Maier & Neustadt, L.L.P.

(57) ABSTRACT

According to one embodiment, a liquid crystal display device includes a first substrate, a second substrate, a liquid crystal layer, a first alignment film, and a sealant, wherein the first alignment film is an optical alignment film, the sealant includes an epoxy resin not having an acrylate skeleton and a resin having an acrylate skeleton, a storage elastic modulus of the sealant is greater than or equal to $1.0\times10^7$ Pa and less than or equal to $1.5\times10^9$ Pa, and at least a part of the sealant is in contact with the first alignment film.

17 Claims, 8 Drawing Sheets

(56) References Cited

U.S. PATENT DOCUMENTS

| | | | |
|---|---|---|---|
| 2012/0133874 A1* | 5/2012 | Hoshina | G02F 1/1339 349/138 |
| 2013/0182213 A1* | 7/2013 | Ishikawa | G02F 1/1339 349/153 |
| 2014/0043574 A1* | 2/2014 | Ichimura | G02F 1/1339 349/138 |
| 2014/0046004 A1 | 2/2014 | Matsumori et al. | |
| 2014/0209237 A1* | 7/2014 | Ogawa | G02F 1/1333 156/273.5 |
| 2015/0210923 A1 | 7/2015 | Matsumori et al. | |
| 2016/0011445 A1* | 1/2016 | Chen | G02F 1/1337 349/110 |

FOREIGN PATENT DOCUMENTS

| | | |
|---|---|---|
| JP | 3242017 | 12/2001 |
| JP | 2005-234129 | 9/2005 |
| JP | 2006-113435 | 4/2006 |
| JP | 2010-32775 | 2/2010 |
| JP | 2010-85712 | 4/2010 |
| JP | 2012-208197 | 10/2012 |
| JP | 5150409 | 2/2013 |

\* cited by examiner

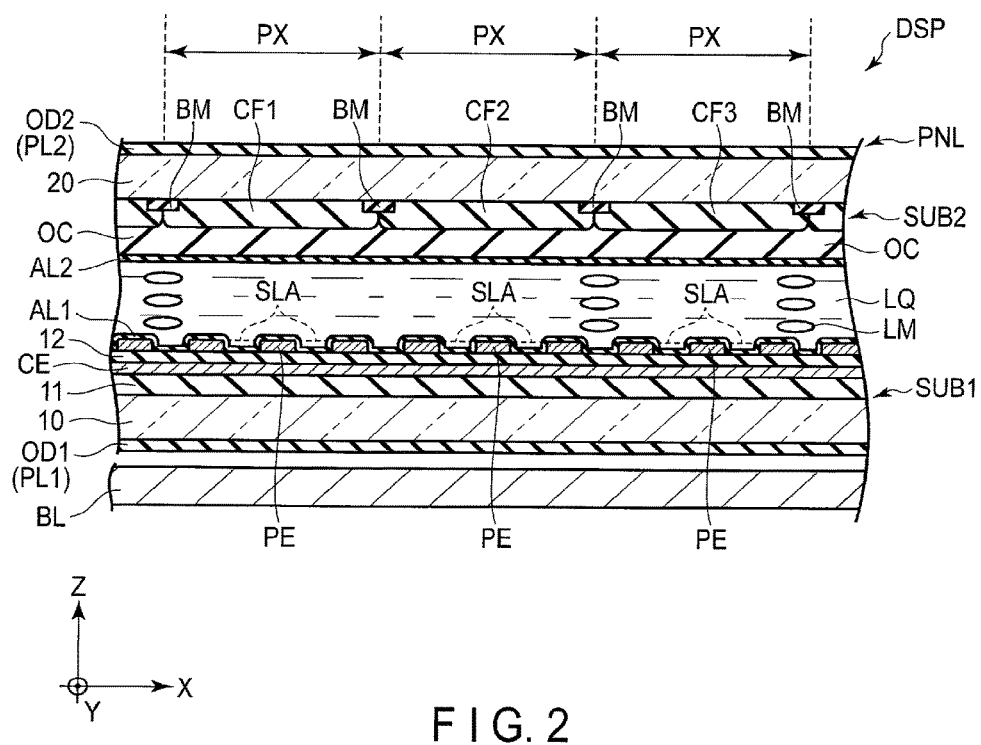
F I G. 2

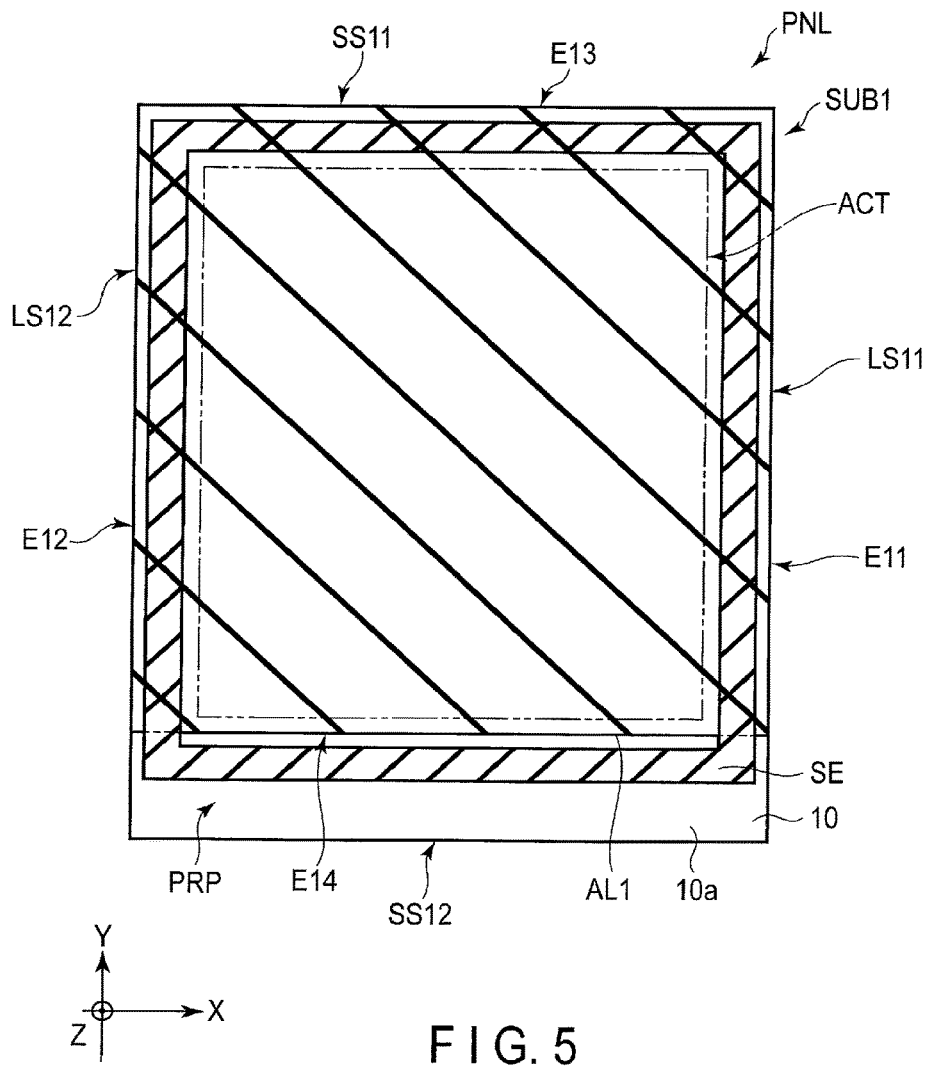
F I G. 5

|  | Structure | UV cure contraction ratio (%) | Storage elastic modulus (Pa) | Tg (°C) |
|---|---|---|---|---|
| Sealant 1 | Acryl | 3.1 | 5.0E+08 | 96 |
| | Epoxy acrylate | | | |
| | Epoxy | | | |
| Sealant 2 | Acryl | 3.1 | 5.0E+08 | 104 |
| | Epoxy acrylate | | | |
| | Epoxy | | | |
| Sealant 3 | Acryl | 3.5 | 1.1E+09 | 105 |
| | Epoxy acrylate | | | |
| | Epoxy | | | |
| Sealant 4 | Acryl | 4.0 | 1.9E+09 | 108 |
| | Epoxy acrylate | | | |
| Sealant 5 | Acryl | 4.7 | 3.0E+09 | 107 |
| | Epoxy acrylate | | | |
| Sealant 6 | Acryl | 4.9 | 3.0E+09 | 108 |
| | Epoxy acrylate | | | |

FIG. 6

|  | Alignment method | Structure of precursor |
|---|---|---|
| Alignment film 1 | Optical alignment | Polyamic acid |
| Alignment film 2 | Optical alignment | Polyamic acid ester |
| Alignment film 3 | Rubbing | Polyamic acid |
| Alignment film 4 | Rubbing | Polyamic acid ester |

FIG. 7

|  | Alignment film 1 | Alignment film 2 | Alignment film 3 | Alignment film 4 |
|---|---|---|---|---|
| Sealant 1 | Example 1 ○ | Example 2 ○ | Reference Example 1 ○ | Reference Example 2 ○ |
| Sealant 2 | Example 3 ○ | Example 4 ○ | Reference Example 3 ○ | Reference Example 4 ○ |
| Sealant 3 | Example 5 ○ | Example 6 ○ | Reference Example 5 ○ | Reference Example 6 ○ |
| Sealant 4 | Comparative Example 1 △ | Comparative Example 2 △ | Reference Example 7 ○ | Reference Example 8 ○ |
| Sealant 5 | Comparative Example 3 △ | Comparative Example 4 △ | Reference Example 9 ○ | Reference Example 10 ○ |
| Sealant 6 | Comparative Example 5 × | Comparative Example 6 × | Reference Example 11 ○ | Reference Example 12 ○ |

FIG. 9

DISPLAY DEVICE

CROSS-REFERENCE TO RELATED APPLICATIONS

This application is based upon and claims the benefit of priority from Japanese Patent Application No. 2015-066402, filed Mar. 27, 2015, the entire contents of which are incorporated herein by reference.

FIELD

Embodiments described herein relate generally to a liquid crystal display device.

BACKGROUND

A liquid crystal display panel provided in a liquid crystal display device includes two substrates opposed to each other and a sealant which seal together those substrates. Recently, since the frame of liquid crystal display devices is becoming smaller, the area of a region in which the sealant is formed is reduced, and the sealant is commonly arranged on an organic film such as an alignment film. Accordingly, a sealant which can obtain a sufficient strength of adhesion even with the organic film in a smaller area has been developed. For example, a sealant which is formed of a curable resin composition for liquid crystal display element whose physical properties, such as the glass transition temperature and coefficient of linear expansion, are defined and a sealant which is characterized in that it does not contain an inorganic filler have been developed.

BRIEF DESCRIPTION OF THE DRAWINGS

FIG. 2 is an illustration showing a cross-section of the liquid crystal display device in a display area.

FIG. 5 is an illustration of a modification of the first substrate viewed from the top.

FIG. 6 is table showing a list of sealants of the embodiment.

FIG. 7 is a table showing a list of alignment films of the embodiment.

FIG. 9 is a list of results of evaluation of the embodiment.

DETAILED DESCRIPTION

Figure 1:
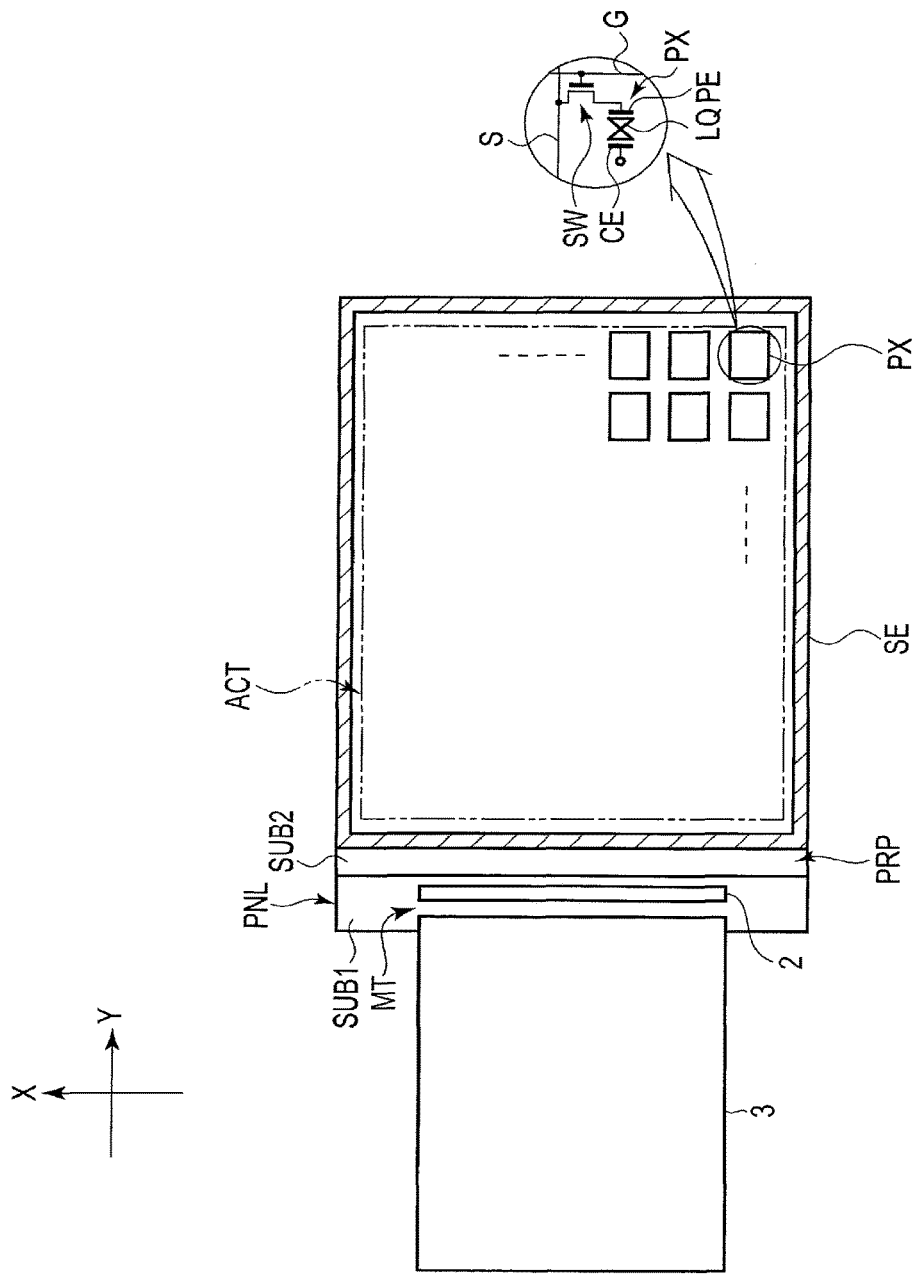
FIG. 1 is an illustration which shows an outline of a liquid crystal display device according to the present embodiment.

In general, according to one embodiment, a liquid crystal display device comprising: a first substrate; a second substrate disposed at a position opposed to the first substrate; a liquid crystal layer which is arranged between the first substrate and the second substrate, and includes liquid crystal molecules; a first alignment film which is formed on the first substrate, and aligns the liquid crystal molecules; and a sealant which adheres the first substrate and the second substrate, wherein the first alignment film is an optical alignment film, the sealant includes an epoxy resin not having an acrylate skeleton and a resin having an acrylate skeleton, a storage elastic modulus of the sealant is greater than or equal to $1.0 \times 10^7$ Pa and less than or equal to $1.5 \times 10^9$ Pa, and at least a part of the sealant is in contact with the first alignment film.

According to another embodiment, a liquid crystal display device comprising: a first substrate; a second substrate opposed to the first substrate; a liquid crystal layer which is held between the first substrate and the second substrate; and a sealant which adheres the first substrate and the second substrate, wherein the first substrate comprises: a first insulating substrate; a insulating film made of an inorganic material disposed above the first insulating substrate; a common electrode made of an inorganic material; a pixel electrode which is made of an inorganic material and is opposed to the common electrode via the insulating film; and a first alignment film which is arranged on a side that is in contact with the liquid crystal layer and is formed of an optical alignment film, the second substrate comprises: a second insulating substrate; an overcoat layer which is arranged on a side of the second insulating substrate that is opposed to the liquid crystal layer; and a second alignment film which covers the overcoat layer and is formed of an optical alignment film, the sealant includes an epoxy resin not having an acrylate skeleton and a resin having an acrylate skeleton, a storage elastic modulus of the sealant is greater than or equal to $1.0 \times 10^7$ Pa and less than or equal to $1.5 \times 10^9$ Pa, and the sealant is in contact with the first alignment film and the second alignment film, and also with the insulating film, the common electrode, or the pixel electrode.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the structural elements, which have functions identical or similar to the functions described in connection with preceding drawings, are denoted by the same reference numbers, and an overlapping detailed description thereof may be arbitrarily omitted.

FIG. 1 is an illustration which shows an outline of a liquid crystal display device according to the present embodiment.

A liquid crystal display device DSP comprises an active-matrix-type display panel PNL. The display panel PNL includes a first substrate SUB1, a second substrate SUB2 which is disposed to be opposed to the first substrate SUB1, and a liquid crystal layer LQ which is held between the first substrate SUB1 and the second substrate SUB2. The first substrate SUB1 and the second substrate SUB2 are adhered to each other by means of a sealant SE with a predetermined cell gap formed therebetween. The liquid crystal layer LQ is held within a region surrounded by the sealant SE formed like a loop in the cell gap between the first substrate SUB1 and the second substrate SUB2. The display panel PNL comprises a display area ACT on which an image is displayed on the inner side surrounded by the sealant SE. The display area ACT is formed in, for example, a substantially rectangular shape, and is constituted by a plurality of pixels PX arrayed in a matrix.

A pixel PX includes a gate line G, a source line S, a switching element SW, a pixel electrode PE, and a common electrode CE. The gate line G extends along a first direction X. The source line S extends along a second direction Y intersecting the first direction X. The switching element SW is electrically connected to the gate line G and the source line S, and the pixel electrode PE is electrically connected to the switching element SW. The common electrode CE is opposed to the pixel electrode PE via the liquid crystal layer LQ. Note that the display panel PNL is shaped as a rectangle, for example, and the first direction X is a direction along the short side of the display panel PNL and the second direction Y is a direction along the long side of the display panel PNL.

In the example illustrated, the first substrate SUB1 comprises a mount MT extending to an outer side than a substrate end portion of the second substrate SUB2. Signal supply sources which supply signals necessary to drive the display panel PNL, such as a driving IC chip 2 and a flexible printed circuit (FPC) board 3, are positioned at PRP, which is exterior to the display area ACT, and are mounted on the mount MT.

FIG. 2 is an illustration showing a cross-section of the liquid crystal display device in the display area.

In this figure, as an example, a fringe field switching (FFS) mode liquid crystal display device which utilizes a lateral electric field is shown. However, the display mode of the liquid crystal display device DSP according to the present embodiment is not particularly limited, and the other modes which utilize the lateral electric field such as an in-plane switching (IPS) mode, or modes which mainly utilize a longitudinal electric field such as a twisted nematic (TN) mode, an electrically controlled birefringence (ECB) mode, an optically compensated bend (OCB) mode, and a vertically aligned (VA) mode may be employed.

The liquid crystal display device DSP comprises the first substrate SUB1, the second substrate SUB2, the liquid crystal layer LQ, a first optical element OD1, a second optical element OD2, and a backlight unit BL.

The first substrate SUB1 comprises a first insulating substrate 10, a first insulating film 11, the common electrode CE, a second insulating film 12, the pixel electrode PE, a first alignment film AL1, etc. The first insulating substrate 10 is formed of a material such as glass or resin having a light transmitting property and an insulating property. The first insulating film 11 is disposed on the first insulating substrate 10. The first insulating film 11 is formed of an organic material such as an acrylic resin. The common electrode CE is formed on the first insulating film 11. The common electrode CE is formed of a transparent conductive material such as indium tin oxide (ITO) or indium zinc oxide (IZO). The second insulating film 12 is disposed on the common electrode CE. The second insulating film 12 is formed of an inorganic material such as silicon oxide or silicon nitride.

The pixel electrode PE is disposed on the second insulating film 12. That is, the pixel electrode PE is opposed to the common electrode CE via the second insulating film 12. Slits SLA are formed in the pixel electrode PE. The slits SLA penetrate the pixel electrode PE so that the second insulating film 12 is exposed. The pixel electrode PE is formed of a transparent, electrically conductive material such as ITO or IZO.

The first alignment film AL1 covers the second insulating film 12 and the pixel electrode PE. In other words, inorganic material layers such as the second insulating film 12 and the pixel electrode PE are in contact with the first alignment film AL1. The first alignment film AL1 is formed of a material exhibiting a horizontal alignment property, and disposed on the side contacting the liquid crystal layer LQ of the first substrate SUB1.

The second substrate SUB2 comprises a second insulating substrate 20, a light-shielding layer BM, a first color filter CF1, a second color filter CF2, a third color filter CF3, an overcoat layer OC, a second alignment film AL2, etc. The second insulating substrate 20 is formed of a material such as glass or resin having a light transmitting property and an insulating property.

The light-shielding layer BM is formed on the side of the second insulating substrate 20 opposed to the liquid crystal layer LQ. The light-shielding layer BM is formed of a black resin material or a light-shielding metal material having a low light transmittance and low reflectivity.

Each of the first color filter CF1, the second color filter CF2, and the third color filter CF3 is formed on the side of the second insulating substrate 20 and the light-shielding layer BM opposed to the liquid crystal layer LQ. Mutually adjacent end portions of the respective color filters are opposed to the light-shielding layer BM. Also, the color filters CF are disposed in pixels PX, respectively. The first color filter CF1 is, for example, a blue-colored filter formed of a resin colored blue. The second color filter CF2 is, for example, a green-colored filter formed of a resin colored green. The third color filter CF3 is, for example, a red-colored filter formed of a resin colored red. The first color filer CF1, the second color filter CF2, and the third color filter CF3 may be formed of a resin colored in another color such as yellow, or may be formed of a non-tinted transparent resin. Also, the liquid crystal display device DSP may further comprise a fourth color filter.

The overcoat layer OC covers each of the color filters. The overcoat layer OC obstructs entry of impurities from the second substrate SUB2 to the liquid crystal layer LQ. The overcoat layer OC is formed of, for example, a transparent resin material.

The second alignment film AL2 covers the overcoat layer OC. The second alignment film AL2 is formed of a material which exhibits a horizontal alignment property, and disposed on a surface contacting the liquid crystal layer LQ of the second substrate SUB2. The first alignment film AL1 and the second alignment film AL2 are subjected to alignment treatment. Each of the first alignment film AL1 and the second alignment film AL2 is formed of, for example, polyimide, and corresponds to an organic material layer. The first alignment film AL1 is an optical alignment film subjected to an optical alignment treatment. The alignment treatment to be performed for the second alignment film AL2 may be a rubbing treatment, but should preferably be an optical alignment treatment as in the case of the first alignment film AL1.

The optical alignment treatment includes a photoisomerization treatment whereby geometrical arrangement in a molecule is changed by irradiating polarized ultraviolet light, a photodimerization treatment whereby molecular frames form a chemical bond by polarized ultraviolet light, a photolysis treatment in which polarized ultraviolet light is irradiated, thereby cutting and decomposing only the polymeric chains aligned in the irradiation direction and maintaining polymeric chains in a direction vertical to the polarization direction, and the like. Among the above treatments, the photolysis-type optical alignment treatment is suitable for a polyimide optical alignment film from the perspective of reliability and achievements.

For example, in creating a photolysis-type optical alignment film, first of all, a precursor of the polyimide dissolved in various solvents is applied over the substrate. Preferably, the precursor of the polyimide should be polyamic acid or polyamic acid ester which has a constituent unit shown in chemical formula 1. While only one kind of polyamic acid or polyamic acid ester may be used, several kinds may be blended and used. Note that in the formula, H represents a hydrogen atom, N represents a nitrogen atom, O represents an oxygen atom, A represents a tetravlent organic group, and D represents a divalent organic group. Examples of A are an aromatic compound such as a phenylene ring, a naphthalene ring, and anthracene ring, an alicyclic compound such as cyclobutane, cyclopentane, and cyclohexane, or a compound obtained by binding a substituent to the aforementioned compounds. Examples of D are an aromatic compound such as phenylene, biphenylene, oxybiphenylene, biphenyleneamine, naphthalene, and anthracene, an alicyclic compound such as cyclohexene and bicyclohexane, or a compound obtained by binding a substituent to the aforementioned compounds. R1 and R2 represent hydrogen or an alkyl group having 6 or less carbon atoms. Further, although polyamic acid or polyamic acid ester is expressed in a trans form in chemical formula 1, it may be a cis form.

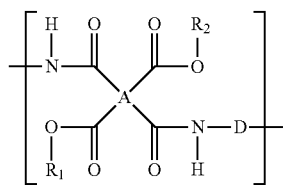
(1)

It is further desirable that polyamic acid or polyamic acid ester has a constituent unit indicated by chemical formula 2 or 3. R3, R4, R5, and R6 each represent one of a hydrogen atom, a halogeno group (fluoro group, chloro group, bromo group), a phenyl group, an alkyl group having 1 to 6 carbon atoms, an alkoxy group having 1 to 6 carbon atoms, an atomic group including a vinyl group represented by —(CH2) m-CH=CH2, and an atomic group including an alkynyl group represented by —(CH2) m-C≡CH (where m in the atomic group is 0, 1, or 2).

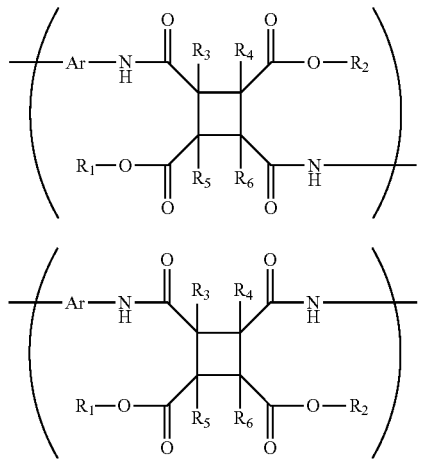
(2)

(3)

Note that Ar in chemical formulas 2 and 3 represents an aromatic compound or a compound obtained by binding a substituent to the aromatic compound. It is desirable that Ar in the above formulas contain at least one of general formulas 4 to 14 given below. However, each of hydrogen atoms of the aromatic ring in general formulas 4 to 14 may be independently substituted by a fluorine atom, a chlorine atom, a bromine atom or a phenyl group, or by an alkyl group, an alkoxy group, a vinyl group or an alkynyl group having 1 to 8 carbon atoms. Also, X is characterized in that it is one of an alkyl group, an alkoxy group, a vinyl group, and an alkynyl group which have 1 to 8 carbon atoms, or includes the following functional group (—O—, —CO—, —COO—, —S—, —SO—, —SO2-, —NH—, —N=N—, a phenyl group) in an alkyl group having 0 to 8 carbon atoms, and Y is an aromatic ring such as a phenyl group, a naphthyl group, an anthracene group, or a pyrene group, and each of hydrogen atoms of the aromatic ring may be independently substituted by a fluorine atom, a chlorine atom, a bromine atom or a phenyl group, or by an alkyl group, an alkoxy group, a vinyl group or an alkynyl group having 1 to 8 carbon atoms. Further, Z is the following functional group (—CH2-, —CO2-, —NH—, —O—, —S—, —SO—, —SO2-), and a hydrogen atom in the functional group may be substituted by a fluorine atom, a chlorine atom, a bromine atom or a phenyl group, or by an alkyl group, an alkoxy group, a vinyl group or an alkynyl group having 1 to 8 carbon atoms.

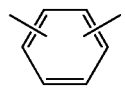
(4)

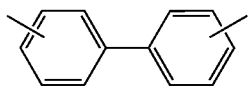
(5)

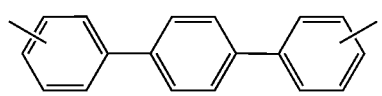
(6)

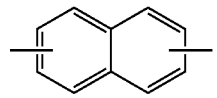
(7)

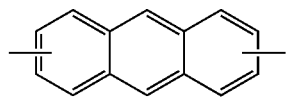
(8)

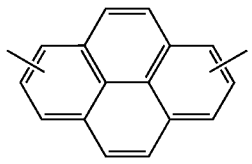
(9)

—Y—X— (10)

—Y—X—Y— (11)

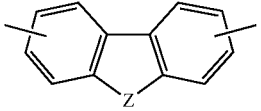
(12)

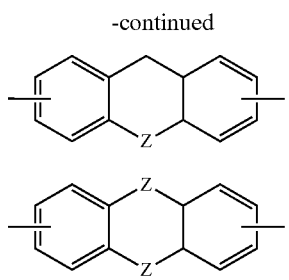

(13)

(14)

Polyamic acid or polyamic acid ester applied on the substrate is heated at a temperature of 50° C. or more, for example, and after a large amount of solvent is removed, it is heated and burned at a temperature of 180° C. or more, for example. By the burning, the polyamic acid or polyamic acid ester is imidized as a result of ring closure reaction. A polyimide film formed in this way serves as an optical alignment film having an alignment restriction force produced on its surface as a result of performing an irradiation treatment with polarized ultraviolet light.

The optical alignment film may include a polyimide derived from a polyamic acid amide or polyamic acid alkylsilyl ester other than polyamic acid or polyamic acid ester described above. As regards the unit structure of the polyamic acid amide and polyamic acid alkylsilyl ester, general formulas 102, 103, 113, and 114 described in paragraph 0022 of JP 5150409 B, for example, may be referred to.

Accordingly, the first alignment film AL1 which is formed of an optical alignment film should preferably include a polyimide derived from polyamic acid or polyamic acid ester described above. Since such first alignment film AL1 can reduce pyrolysis of the polyimide when the optical alignment film is burned, stability of the alignment of liquid crystal molecules LM can be improved. That is, the display quality of the liquid crystal display device DSP can be improved. A similar advantage can be obtained from an optical alignment film including a polyimide derived from polyamic acid amide or polyamic acid alkylsilyl ester. Also, since an optical alignment film including a polyimide derived from polyamic acid can reduce the specific resistivity of itself, it is possible to prevent an image lag (burn-in) of the liquid crystal display device DSP from occurring. The second alignment film AL2, which is constituted of an optical alignment film similar to the one in the first alignment film AL1, can bring about a similar advantage.

Further, the first alignment film AL1 and the second alignment film AL2 may include residues generated in a forming step such as various additives including a silane coupling agent, a cross-linking agent, a leveling agent, an antifoaming agent, and an oxidizer, and a residual solvent.

A rubbing film formed by a rubbing treatment is formed in the same way as the optical alignment film was formed until the burning. After burning, as the surface of the polyimide film is rubbed in a predetermined direction by a rubbing cloth such as a buff cloth, a polyimide polymeric chain at the surface is brought to be aligned in that direction, thereby forming a rubbing film having an alignment restriction force produced on its surface. The optical alignment film and the rubbing film are different in the occurrence of pre-tilt, an alignment property of a polymeric chain, etc. More specifically, while liquid crystal molecules aligned by the rubbing film are pre-tilted, liquid crystal molecules aligned by the optical alignment film are not pre-titled. For this reason, the optical alignment film is suitable for use in a lateral electric field liquid crystal display device. Also, while the polymeric chain of the optical alignment film is aligned in the entire region in the film thickness direction onto which the polarized ultraviolet light is irradiated, the polymeric chain of the rubbing film is aligned only at the surface which is rubbed by the rubbing cloth. As a result, the optical alignment film and the rubbing film have different levels of magnitude of retardation in a direction vertical to the substrate (i.e., the film thickness direction). For example, generally, the retardation of the optical alignment film is greater than 1 nm, and generally, the retardation of the rubbing film is 1 nm or less. As described above, the polymeric chain which forms the optical alignment film is aligned in one direction, and the film strength in a direction perpendicular to the direction in which the molecules are aligned is reduced in the case of such a polymeric chain. Accordingly, as compared to an alignment film including a random polymeric chain which is not anisotropic, the film strength of such an alignment film tends to be low. When the film strength of the alignment film is reduced, the strength of adhesion between the alignment film and a sealant formed thereon is reduced. As can be seen, because of a difference in the above-described alignment property of the polymeric chain, for example, the strength of adhesion of the optical alignment film to the sealant tends to be lower than that of the rubbing film.

The liquid crystal layer LQ is disposed between the first substrate SUB1 and the second substrate SUB2. The liquid crystal layer LQ includes the liquid crystal molecules LM. The major axes of the liquid crystal molecules LM are under the influence of the alignment restriction force of the first alignment film AL1 and the second alignment film AL2, and aligned along the surface of each of the first alignment film AL1 and the second alignment film AL2. That is, the liquid crystal molecules LM are initially aligned parallel to the first substrate SUB1 and the second substrate SUB2.

Figure 3:
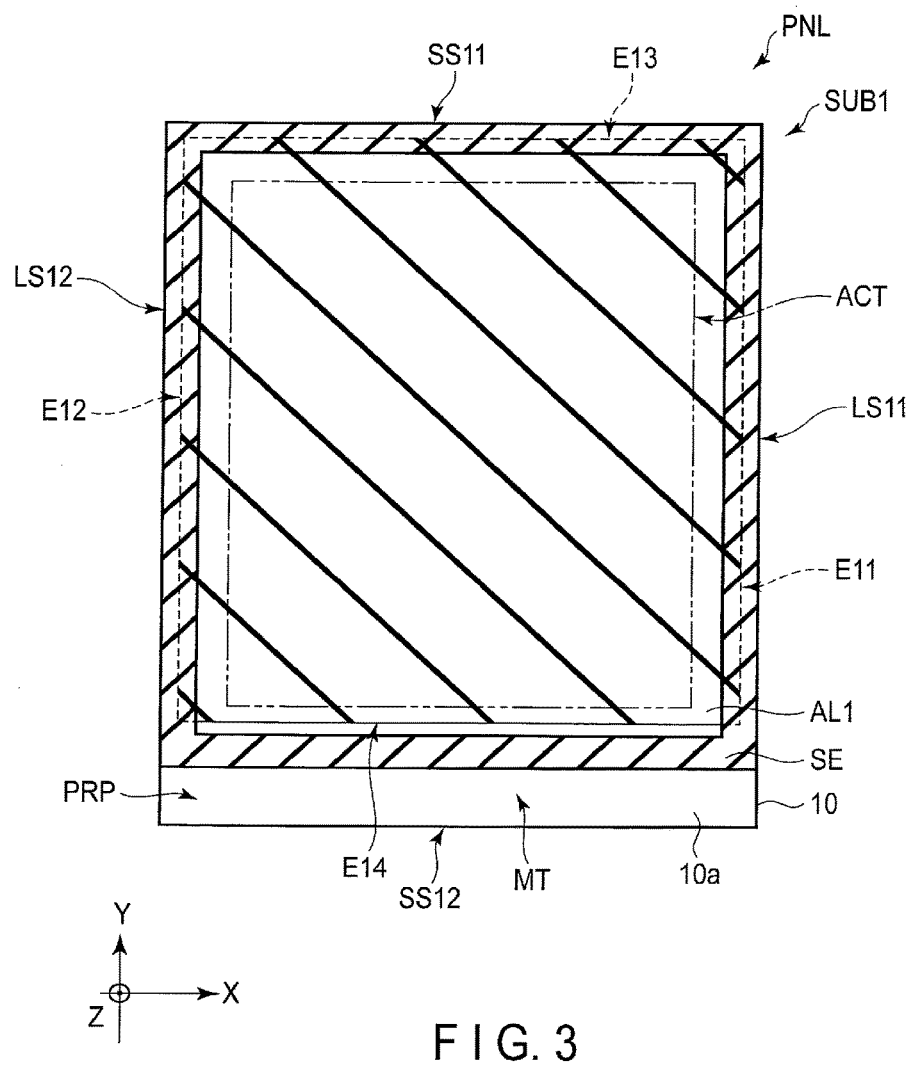
FIG. 3 is an illustration of a first substrate viewed from the top in a normal direction of the substrate main surface.

FIG. 3 is an illustration of the first substrate viewed from the top in a normal direction of the substrate main surface. A third direction Z is the direction which crosses the first direction X and the second direction Y. In the example illustrated, the third direction Z is the direction which is orthogonal to the first direction X and the second direction Y. A main surface 10a of the first substrate 10 is a plane which extends in the first direction X and the second direction Y. The normal direction of the main surface 10a corresponds to the third direction Z.

The first substrate SUB1 includes, for example, a first long side LS11, a second long side LS12, a first short side SS11, and a second short side SS12. The first long side LS11 extends in the second direction Y. The second long side LS12 extends in the second direction Y, and is opposed to the first long side LS11 in the first direction X. The first short side SS11 extends in the first direction X. The second short side SS12 extends in the first direction X, and is opposed to the first short side SS11 in the second direction Y. The mount MT is located near the second short side SS12.

The first alignment film AL1 is opposed to the main surface 10a in the third direction Z, and end portions E11 to E14 of the first alignment film AL1 are located in a peripheral area PRP. The end portion E11 is located near the first long side LS11, the end portion E12 is located near the second long side LS12, the end portion E13 is located near the first short side SS11, and the end portion E14 is located near the second short side SS12. In the example illustrated, the end portions E11 to E14 are not opposed to the respective sides corresponding to the first substrate SUB1 in the third direction Z. That is, the end portion E11 is located closer to the display area ACT side than the first long side LS11. The same applies to end portions E12 to E14. Also, it is preferable that the first alignment film AL1 be not extended to the mount MT.

However, in order to more evenly form the thickness of the alignment film in the display area ACT, it is preferable that each of the end portions of the first alignment film AL1 be formed at a place near each side corresponding to the first substrate SUB1 as much as possible. This is because when the alignment film is to be formed by coating, the thickness of the alignment film tends to be increased at the end portions. Recently, in order to achieve a narrower frame structure, the width of the peripheral area PRP is becoming small. For example, the width of the peripheral area PRP at each side other than the second short side SS12 including the mount MT may be less than 1.5 mm. Accordingly, the desired first alignment film AL1 of the present embodiment can restrain disturbance in alignment of the liquid crystal molecules. Note that the same applies to the second alignment film AL2.

Further, although the end portions E11 to E14 are depicted to be linear in the drawing, the shape of the end portions E11 to E14 is not restricted, and part of them may be bent. Also, the end portion E11 may be opposed to at least a part of the first long side LS11 in the third direction Z. The same applies to the end portions E12 and E13.

The sealant SE is disposed above the main surface 10a along each side of the first substrate SUB1. In the example illustrated, the sealant SE is opposed to the end portions E11, E12, and E13 of the first alignment film AL1 in the third direction Z. Meanwhile, although the sealant SE which extends along the second short side SS12 is located closer to the second short side SS12 than the end portion E14, this sealant SE may be located closer to the display area ACT side than the end portion E14, and may be in contact with the end portion E14. That is, at least part of the sealant SE contacts the first alignment film AL1.

Further, as shown in FIG. 2, the first alignment film AL1 is formed on the inorganic material layers. Accordingly, in the example illustrated, the sealant SE which extends along the first long side LS11, the second long side LS12, and the first short side SS11 are in contact with the end portions E11 to E13 of the first alignment film AL1, respectively, and also with the inorganic material layer which is exposed from the first alignment film AL1. As the sealant SE is in contact with the inorganic material layer, adhesion between the sealant SE and the first substrate SUB1 is improved.

The sealant SE is, for example, a photocuring-thermotsetting combination sealing member, and is formed by performing a hardening treatment to a liquefied curable resin composition. The curable resin composition includes curable resin, a hardener, an additive, and the like. The hardening treatment for the photocuring-thermotsetting combination sealant includes a photocuring step in which light such as ultraviolet light is irradiated, and a thermosetting step in which the object is heated in no particular order. The curable resin composition is applied to a surface of one of the substrates to be adhered by, for example, a dispensing method. After that, in a state in which the substrates are attached to each other, the sealant SE is cured by the above-described hardening treatment. The photocuring-thermotsetting combination sealant, for example, in which temporary curing is performed first by the photocuring step and primary curing is performed next by the thermosetting step, is adopted for the sealant SE. However, the sealant is not limited to the aforementioned type, and may be a photcuring or thermosetting sealant.

A storage elastic modulus of the sealant SE after the hardening treatment is greater than or equal to $1.0 \times 10^7$ Pa and less than or equal to $1.5 \times 10^9$ Pa. When the storage elastic modulus is less than $1.0 \times 10^7$ Pa, sufficient function cannot be exhibited as the sealant SE, and a misalignment may be caused between the substrates to be adhered by the sealant SE. When the storage elastic modulus exceeds $1.5 \times 10^9$ Pa, stress cannot be fully dispersed by the sealant SE, and the sealant SE may be peeled as the stress is concentrated on the interface between the sealant SE and either of the substrates. More preferably, the storage elastic modulus of the sealant SE should be greater than or equal to $1.0 \times 10^8$ Pa and less than or equal to $1.5 \times 10^9$ Pa. Note that the storage elastic modulus can be measured by a method described in the present specification.

A photocuring contraction coefficient in the photcuring step of the sealant SE should preferably be greater than or equal to 0.1% and less than or equal to 3.8%. More preferably, the photocuring contraction coefficient should be greater than or equal to 1.5% and less than or equal to 3.8%, and yet more preferably, the photocuring contraction coefficient should be greater than or equal to 2.0% and less than or equal to 3.8%. Note that in the case of a photocuring-thermotsetting combination sealant, preferably, a total contraction coefficient of a photocuring contraction coefficient and a thermotsetting contraction coefficient should also be greater than or equal to 0.1% and less than or equal to 3.8%. More preferably, it should be greater than or equal to 1.5% and less than or equal to 3.8%, and yet more preferably, greater than or equal to 2.0% and less than or equal to 3.8%. When the photocuring contraction coefficient is less than 0.1%, moisture permeability of the sealant SE becomes too high and moisture may permeate the liquid crystal layer. If the contraction coefficient exceeds 3.8%, a substrate surface such as the first alignment film AL1 may be damaged by contraction, and the strength of adhesion between the substrates may be reduced. Accordingly, the sealant SE which has a desirable contraction coefficient of the present embodiment can prevent occurrence of non-uniformity in display which results from the impurities (moisture) of the liquid crystal layer, and also prevent occurrence of substrate misalignment. Note that the contraction ratio can be measured by a method described in the present specification.

The glass transition temperature (Tg) of the sealant SE should preferably be greater than or equal to 30° C. and less than or equal to 140° C. More preferably, Tg should be greater than or equal to 60° C. and less than or equal to 120° C. When Tg is less than 30° C., under the use environment of the liquid crystal display device, the sealant SE may be softened and deformed. When Tg exceeds 140° C., stress cannot be fully dispersed because the sealant SE is too hard, and the sealant SE may be peeled as the stress is concentrated on the interface between the sealant SE and the substrate. Therefore, the sealant SE having desirable Tg of the present embodiment can prevent occurrence of substrate misalignment. Note that Tg is a value measured by differential scanning calorimetry (DSC) based on a "Method of measuring transition temperature of plastic" of JIS K 7121. More specifically, Tg is measured by a method described in the present specification.

The sealant SE having such a desirable storage elastic modulus, photocuring contraction coefficient, and Tg of the present embodiment includes an epoxy resin not having an acrylate skeleton, and a resin having an acrylate skeleton as a curable resin. For example, the epoxy resin not having the acrylate skeleton serves as a thermosetting resin, and the resin having the acrylate skeleton serves as a photocuring resin. The epoxy resin not having the acrylate skeleton may serve as a photocuring resin.

The epoxy resin not having the acrylate skeleton is not particularly limited, and may be suitably selected from glycidyl ether epoxy resin, glycidyl ester epoxy resin, glycidyl amine epoxy resin, alicyclic epoxy resin, etc. For example, the epoxy resin may be bisphenol A epoxy resin, bisphenol F epoxy resin, bisphenol S epoxy resin, hydrogenated bisphenol epoxy resin, propylene oxide-added bisphenol A epoxy resin, resorcinol epoxy resin, biphenyl epoxy resin, sulfide epoxy resin, ether epoxy resin, dicyclopentadiene epoxy resin, naphthalene epoxy resin, phenol novolak epoxy resin, orthocresol novolak epoxy resin, dicyclopentadiene novolak epoxy resin, biphenyl novolak epoxy resin, glycidylamine epoxy resin, alkyl polyol epoxy resin, rubber modified epoxy resin, glycidyl ester compound, bisphenol A episulfide resin, or the other epoxy resins. The epoxy resin not having the acrylate skeleton may be used alone, or two or more such epoxy resins may be used in combination.

The resin having the acrylate skeleton is not particularly limited, and may be suitably selected from polyester (meth)acrylate resin, epoxy (meth)acrylate resin, urethane (meth)acrylate resin, etc. The resin having the acrylate skeleton may be used alone, or two or more kinds of those resins may be used in combination.

Polyester (meth)acrylate resin described above is a polymer of an ester compound which can be obtained by causing a compound having a hydroxyl group to react with (meth) acrylic acid. The ester compound is not particularly limited, and it may be monofunctional (meth)acrylic acid ester having one (meth)acrylic group, or polyfunctional (meth) acrylic acid ester having two or more (meth)acrylic groups. For example, for the ester compound, compounds described in JP 2010-85712A, from paragraph 0010 to paragraph 0012, may be referred to. Polyester (meth)acrylate resin may be a copolymer formed of a plurality of ester compounds.

The epoxy (meth)acrylate resin described above is not particularly limited, and may be a polymer which can be obtained by, for example, causing an epoxy resin and (meth)acrylic acid to react with each other under the presence of a basic catalyst. The above epoxy resin is not particularly limited, and may be suitably selected from epoxy resins not having the acrylate skeleton, for example. An epoxy (meth)acrylate resin may be a copolymer formed by a plurality of epoxy resins or a plurality of (meth)acrylic acids.

A (meth)acrylic acid derivative having the hydroxyl group is not particularly limited, and compounds described in paragraph 0020 of JP 2010-85712A may be referred to. The (meth)acrylic acid derivative having the hydroxyl group may be used alone, or two or more such derivatives may be used in combination.

The hardener described above may be, for example, a photoradical initiator for causing a (meth)acrylic group to react in a photocuring step, and a thermal polymerization initiator for causing an epoxy group to react in a thermosetting step. The photoradical initiator is not particularly limited, and compounds which produce radicals when irradiated with ultraviolet light, such as an acetophenone compound, a benzophenone compound, a benzoin compound, a benzoin ether compound, an acylphosphine oxide compound, and a thioxanthone compound, can be named as examples of the photoradical initiator. The thermal polymerization initiator suitable for an epoxy group is not particularly limited, and examples of such a thermal polymerization initiator are a hydrazide compound, an amine compound, an imidazole derivative, a guanidine derivative, a polyhydric phenolic compound, and an acid anhydride.

Although the content of the photoradical initiator is not particularly limited, the content of the photoradical initiator should preferably be greater than or equal to 0.1 parts by mass and less than or equal to 10 parts by mass with respect to 100 parts by mass of the resin having the acrylate skeleton. If the content of the photoradical initiator is less than 0.1 parts by mass, the sealant SE may not be sufficiently cured. Also, if the content of the photoradical initiator exceeds 10 parts by mass, storage stability of the curable resin composition may be degraded.

Although the content of the thermal polymerization initiator is not particularly limited, the content of the thermal polymerization initiator should preferably be greater than or equal to 1 part by mass and less than or equal to 50 parts by mass with respect to 100 parts by mass of the epoxy resin not having the acrylate skeleton. If the content of the thermal polymerization initiator is less than 1 part by mass, the sealant SE may not be sufficiently cured. Also, if the content of the thermal polymerization initiator exceeds 50 parts by mass, the viscosity of the curable resin composition may be increased, and the coating properties may be impaired. More preferably, the content of the thermal polymerization initiator should be 30 parts by mass or less.

The melting point of the thermal polymerization initiator should preferably be greater than or equal to 100° C. or more and less than or equal to 200° C. If the melting point is less than 100° C., the storage stability of the curable resin composition may be degraded. If the melting point exceeds 200° C., the heating temperature in the thermosetting step is raised, and a misalignment may be caused between the substrates at the time of hardening treatment of the sealant SE.

The average particle diameter of the thermal polymerization initiator should preferably be within the range of not affecting the cell gap between the first substrate SUB1 and the second substrate SUB2, and more preferably, should be greater than or equal to 0.1 µm and less than or equal to 5 µm. If the average particle diameter is less than 0.1 µm, the storage stability of the curable resin composition may be degraded. If the average particle diameter exceeds 5 µm, a heating time in the thermosetting step is increased, and a misalignment may be caused between the substrates at the time of hardening treatment of the sealant SE. Note that the average particle diameter intended in the present specification is a volume average particle diameter based on a light scattering method.

The hardener described above may further include, for example, a thermal radical initiator for causing a (meth) acrylic group to react in the thermosetting step, and a photopolymerization initiator for causing an epoxy group to react in the photocuring step. The thermal radical initiator is not particularly limited, and a peroxide, an azo compound, etc., are named as examples of the thermal radical initiator. The photopolymerization initiator is not particularly limited, and various photocationic initiators are named as examples of the photopolymerization initiator.

Also, the sealant SE may include a coupling agent to have adhesive properties.

The sealant SE should preferably have a filler for the purpose of stress dispersion. The filler is not particularly limited, and may be, for example, an inorganic filler formed of an inorganic material such as synthetic silica, a talc calcium carbonate, a magnesium carbonate, and a titanium carbonate, an organic filler formed of an organic material such as polyester, polyurethane, a vinyl polymer, and an acrylic polymer, or a hybrid filler of these organic and inorganic materials. From the standpoint of the properties of adhesiveness with the organic material layer, the filler should preferably be an organic filler. Note that these filler may be used alone, or two or more kinds of fillers may be used in combination.

The average particle diameter of the filler is not particularly limited as long as it is within the range of not affecting the cell gap between the first substrate SUB1 and the second substrate SUB2. However, preferably, it should be 2 μm or less. In addition, although the blending quantity of the filler is not particularly limited, the blending quantity should preferably be greater than or equal to 3 parts by mass and less than or equal to 40 parts by mass with respect to 100 parts by mass of curable resin. If the blending quantity is less than 3 parts by mass, a function as the filler is not sufficiently exhibited. If the blending quantity exceeds 40 parts by mass, the viscosity of the curable resin composition may be increased, and the coating properties may be impaired. More preferably, the blending quantity of the filler should be greater than or equal to 5 parts by mass and less than or equal to 30 parts by mass.

The sealant SE may further include additives such as a reactive diluent for adjusting viscosity, a thixotropic agent for adjusting thixotropy, a spacer for adjusting cell gap, a hardening accelerator, an antifoaming agent, a leveling agent, and a polymerization inhibitor, according to need.

Figure 4:
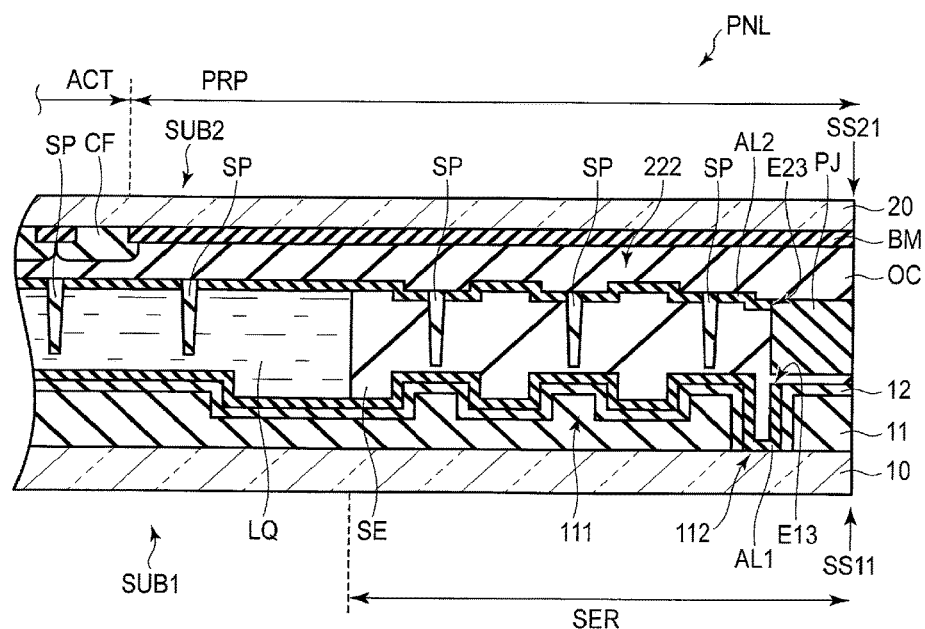
FIG. 4 is an illustration showing a cross-section of the liquid crystal display device at a first short side.

FIG. 4 is an illustration showing a cross-section of the liquid crystal display device at the first short side. Note that a planar view in the description of FIG. 4 means the state in which the display panel PNL is seen from the third direction Z.

The display panel PNL comprises a spacer SP and a projection PJ. The spacer SP is formed on, for example, the second substrate SUB2, and extends in the third direction Z from the second substrate SUB 2 to the first substrate SUB1. For example, the spacer SP is formed to be columnar. The spacer SP is arranged to maintain the cell gap between the first substrate SUB1 and the second substrate SUB2. Accordingly, the spacer SP is disposed in not only a seal area SER in which the sealant SE is formed, but also the other areas such as the peripheral area PRP and the display area ACT. For example, the spacer SP is formed on the overcoat layer OC of the second substrate SUB2, and its periphery is surrounded by the second alignment film AL2 in the planar view. A distal end of the spacer SP may be or may not be in contact with the first substrate SUB1.

The spacer SP is formed of, for example, a resin material. When an acrylic resin is to be used as the resin material for forming the spacer SP, the acrylic resin is desirable because it has a high affinity to the sealant of the present embodiment.

The projection PJ is arranged in the seal area SER of the second substrate SUB2, for example, and extends in the third direction Z from the second substrate SUB2 to the first substrate SUB1. The projection PJ may be formed at an end portion of the second substrate SUB2 (i.e., in the example illustrated, at a first opposed short side SS21 of the second substrate SUB2 which is opposed to the first short side SS11). Here, it is preferred that a distal end of the projection PJ do not contact the first substrate SUB1. The reason for this is to avoid the projection PJ from affecting the cell gap.

Note that the projection PJ formed in the seal area SER near the first short side SS11, the first long side LS11, and the second short side LS12 extends along each side and in the extending direction of the sealant SE in the planar view.

Further, whether or not to arrange the projection PJ in an area in which the sealant SE is formed is arbitrary with respect to a region near the second short side SS12.

Moreover, the projection PJ may be formed such that it is discontiguous or contiguous in the extending direction of the sealant SE. The projection PJ may alternatively be formed on the first substrate SUB1, and extend from the first substrate SUB 1 to the second substrate SUB2 in the third direction Z. The projection PJ is formed of, for example, a resin material. When an acrylic resin is to be used as the resin material for forming the projection PJ, the acrylic resin is desirable because it has a high affinity to the sealant of the present embodiment. Further, when the projection PJ is to be formed on the substrate on which the spacer SP is formed, it is desirable that the projection PJ be formed of the same material as one used for the spacer SP. In this case, the projection PJ can be formed in the same step as the step of forming the spacer SP, and the number of steps required for manufacturing the liquid crystal display device DSP can be reduced.

The display panel PNL should preferably have irregularities (grooves) formed on a surface of at least the substrate on which the projection PJ is not formed of the surfaces of the substrates which are opposed to each other, in the peripheral area PRP. By this structure, a precursor of the alignment film can be prevented from being spread out excessively. More preferably, the irregularities should be formed on the surface on both sides of the mutually opposed substrates. The irregularities should preferably be formed in the seal area SER, in particular. In this way, the alignment film can be extended up to the seal area SER, and reduction of the display quality caused by a change in the thickness of the alignment film can be restrained.

From the standpoint of preventing the precursor of the alignment film from being spread out excessively, it is preferable that the height of irregularities formed on the surface of the substrate on which the projection PJ is not formed be greater than that of the irregularities formed on the surface of the substrate on which the projection PJ is formed, and that the irregularities formed on the surface of the substrate on which the projection PJ is not formed be greater in the number of steps. Also, in order to stop the precursor from spreading out in the seal area SER, it is preferable that the height of the irregularities formed on the surface which is in contact with the sealant SE be greater than the height of the irregularities formed on the surface which is in contact with the liquid crystal layer LQ.

In the example illustrated, in the peripheral area PRP, irregularities 111 are formed on the surface of the first substrate SUB1, and irregularities 222 are formed on the surface of the second substrate SUB2. Further, the irregularities 111 and 222 are formed in the seal area SER, and the irregularities 222 are formed on the surface which is closer to the display area ACT side than a surface on which the projection PJ is formed. Note that the irregularities 111 may be opposed to the projection PJ in the third direction Z.

Also, it is preferable that the irregularities 111 and 222 be extended along the projection PJ and the extending direction of the sealant SE in the planar view. The irregularities 111 and 222 which extend along the projection PJ and the sealant SE can restrain unevenness of the spreading of the precursor of the first alignment film AL1 and the second alignment film AL2.

It should be noted that the irregularities 111 can be formed by varying the film thickness of the first insulating film 11, for example. In the example illustrated, since the first insulating film 11 is formed thick by an organic material, deep irregularities 111 can be formed. However, the irregularities 111 may be formed by using, for example, the second insulating film 12, other than the first insulating film 11 of the first substrate SUB1. Meanwhile, the irregularities 222 are formed by varying the film thickness of the overcoat layer OC, for example. However, the irregularities 222 may be formed by using, for example, the light-shielding layer BM and the color filter CF, other than the overcoat layer OC of the second substrate SUB2.

From the standpoint of preventing the spreading of the precursor of the alignment film, it is preferable that at least one recess 112 of the irregularities 111 should penetrate the first insulating film 11 in the third direction Z. In the example illustrated, the recess 112, which formed at a position closest to the first short side SS11 in the irregularities 111, penetrates the first insulating film 11 in the third direction Z. The recess 112 may also penetrate the second insulating film 12 in the third direction Z. Note that the recess 112 which penetrates the first insulating film 11 may be formed near the first long side LS11 or the second long side LS12.

When the strength of adhesion between the sealant SE and the first alignment film AL1 is sufficiently good, generally, boundary separation may be caused between the first alignment film AL1 and an underlayer which is in contact with the first alignment film AL1. However, in the present drawing, in an area where the sealant SE is formed, the second insulating film 12 corresponding to the underlayer is an inorganic material layer having a better strength of adhesion with the first alignment film AL1 than by the organic material layer. Also, since the contact area can be increased by the irregularities 111 as compared to a smooth surface, the strength of adhesion between the underlayer and the first alignment film AL1 can be improved. Thus, the present embodiment has a structure in which boundary separation between the sealant SE and the underlayer is less likely to occur. Alternatively, the underlayer may be a transparent conductive material such as ITO which is not shown. Even in such a case, ITO, which is the underlayer, is an inorganic material layer having a better strength of adhesion with the first alignment film AL1 than by the organic material layer.

Since the interface between each of the layers may become an entry channel for moisture, preferably, there should be as few interfaces located at end portions of the first substrate SUB1 and the second substrate SUB2 as possible. Accordingly, in a place near the first opposed short side SS21, the projection PJ should preferably be adjacent to an end portion E23 of the second alignment film AL2. The reason for this is because the projection PJ obstructs the spreading of the precursor of the second alignment film AL2 in an application step of the second alignment film AL2.

Alternatively, the spreading of the precursor of the alignment film may be obstructed by the irregularities 222, for example, other than the projection PJ. Therefore, it is sufficient if the projection PJ is not adjacent to and separated from the end portion E23. Meanwhile, in the first substrate SUB1, the spreading of the precursor of the alignment film in the first alignment film AL1 is obstructed by the irregularities 111.

Consequently, the interface between the second alignment film AL2 and the overcoat layer OC is located closer to the display area ACT side than the first opposed short side SS21, and the interface between the first alignment film AL1 and the second insulating film 12 is located closer to the display area ACT side than the first short side SS11. Accordingly, the display panel PNL can restrain entry of moisture into the liquid crystal layer LQ from the first substrate SUB1 and the second substrate SUB2.

In the example illustrated, the end portion E13 of the first alignment film AL1 is opposed to the projection PJ. The above structure is obtained because a part of the irregularities 111 is opposed to the projection PJ, and the first alignment film AL1 is formed on the surface of the first substrate SUB1 along the irregularities 111. The end portion E23 of the second alignment film AL2 is located closer to the display area ACT side than the projection PJ. That is, in the planar view, a distance between the end portion of the first substrate SUB1 and the end portion of the first alignment film AL1 is less than a distance between the end portion of the second substrate SUB2 and the end portion of the second alignment film AL2. The above applies to places near the first long side LS11 and the second long side LS12.

The sealant SE which extends along the first short side SS11 is, for example, in contact with the second alignment film AL2, the spacer SP, and the projection PJ, which are formed on the side of the second substrate SUB2. Also, the sealant SE which extends along the first short side SS11 is in contact with the first alignment film AL1 formed on the side of the first substrate SUB1, and is further in contact with the end portion E13 and the inorganic material layer exposed from the first alignment film AL1. Of the above elements, the inorganic material layer is formed of an inorganic material. In contrast, the first alignment film AL1, the second alignment film AL2, the spacer SP, and the projection PJ are formed of an organic material. That is, the area that the sealant SE is in contact with the organic material is greater than the area that the same is in contact with the inorganic material. The above applies to the sealant which extends along the first long side LS11 and the second long side LS12.

As described above, in the present embodiment, the liquid crystal display device DSP comprises the sealant SE including an epoxy resin not having an acrylate skeleton and a resin having an acrylate skeleton, and in which the storage elastic modulus is greater than or equal to $1.0 \times 10^7$ Pa and less than or equal to $1.5 \times 10^9$ Pa. As a result, the sealant SE can also obtain a good strength of adhesion with the first substrate SUB1 comprising the first alignment film AL1, which is an optical alignment film. Further, even if the area that the sealant is in contact with the inorganic material is greater than the area that the same is in contact with the organic material, a good strength of adhesion can be obtained.

As described above, according to the present embodiment, a liquid crystal display device DSP whose reliability has been improved can be provided.

Next, a modification of the present embodiment will be described.

FIG. 5 is an illustration of a modification of the first substrate viewed from the top.

The present embodiment is different from the embodiment illustrated in FIG. 3 in that the end portion E11 is located at the first long side LS11, the end portion E12 is located at the second long side LS12, and the end portion E13 is located at the first short side SS11. Also, in the point that the sealant SE is located closer to the display area ACT side than the first long side LS11, the second long side LS12, and the first short side SS11, the present embodiment is different from the embodiment illustrated in FIG. 3. That is, in the planar view, the sealant SE is not opposed to the end portions E11 to E13.

Also in this embodiment, the sealant SE can obtain a good strength of adhesion with the first substrate SUB1, and also prevent occurrence of substrate misalignment. Also, since an optical alignment film is provided, the display quality of the liquid crystal display device DSP can be improved and occurrence of an image lag (burn-in) can be prevented. In addition, the liquid crystal display device DSP can prevent reduction of the display quality caused by a change in the thickness of the alignment film. That is, also in the present embodiment, a liquid crystal display device DSP whose reliability has been improved can be provided.

Although the form of the present embodiment will be described in detail based on examples given below, the present embodiment is not limited to the examples given below.

<Sealant>

As the curable resin, by mixing resins described in the column "Structure" in the table indicated in FIG. 6, sealants 1 to 6 exhibiting the physical properties such as the UV cure contraction ratio, storage elastic modulus, and glass transition temperature (Tg) indicated in FIG. 6 were prepared. Note that in each example, common ingredients such as the hardener and various additives are omitted and not described. Sealants 1 to 3 correspond to the sealant SE which satisfies the condition of physical properties described in the present embodiment (storage elastic modulus: $1.0 \times 10^7$ to $1.5 \times 10^9$ Pa; UV cure contraction ratio: 0.1 to 3.8%). In contrast, sealants 4 to 6 do not satisfy the condition of physical properties described in the present embodiment.

<UV Cure Contraction Ratio>

The UV cure contraction ratio in FIG. 6 refers to the photocuring contraction coefficient which is obtained by the irradiation of ultraviolet light (UV) in the photocuring step. The UV cure contraction ratio was measured by a method described below. That is, a curable resin composition of the sealant indicated in each of the examples was applied 100 μm thick on soda lime glass, and by irradiating the ultraviolet light (light source: mercury xenon lamp manufactured by Ushio, Inc.; luminous intensity: 100 mW/cm$^2$; integrated light quantity: 3000 mJ/cm$^2$) and curing the composition under a nitrogen circulation atmosphere, a cured material was obtained.

In each example, the specific gravity of the curable resin composition before hardening (pre-curing specific gravity) and the specific gravity of the cured material obtained after hardening (cured material specific gravity) were measured in the environment of 25° C. by using an electronic balance provided with a specific gravity measurement kit (manufactured by Sartorius; product name; CPA 224S), and the cure contraction ratio (unit: %) was calculated by the equation given below based on a difference in specific gravity before and after the curing.

Cure contraction ratio (%)=(cured material specific gravity−pre-curing specific gravity)/pre-curing specific gravity×100

<Storage Elastic Modulus>

The storage elastic modulus indicated in FIG. 6 was measured by a method described below. That is, a curable resin composition of the sealant indicated in each of the examples was applied 100 μm thick on soda lime glass, and the ultraviolet light (light source: mercury xenon lamp manufactured by Ushio, Inc.; luminous intensity: 100 mW/cm$^2$; integrated light quantity: 3000 mJ/cm$^2$) was irradiated to cure the composition under a nitrogen circulation atmosphere. After that, by using a rheometer (manufactured by Anton Paar; product name: MCR-301), the storage elastic modulus (unit: Pa) of the cured material was measured. As the measurement condition, a frequency of 1 Hz, distortion of 5%, and a temperature of 25° C. were set.

<Glass Transition Temperature (Tg)>

The glass transition temperature in FIG. 6 was measured by a method described below. That is, a curable resin composition of the sealant indicated in each of the examples was applied 100 μm thick on a smooth template film, and by irradiating the ultraviolet light (light source: mercury xenon lamp manufactured by Ushio, Inc.; luminous intensity: 100 mW/cm$^2$; integrated light quantity: 3000 mJ/cm$^2$) under a nitrogen circulation atmosphere, a cured material was prepared. The cured material was peeled off from the template film and cut out in the size of 10 mg. After that, by using a differential scanning calorimeter (manufactured by Seiko Instruments Inc.; product name: EXSTAR DSC6200) at a rising temperature of 10° C./min and within the range of the measurement temperature of −100 to 200° C., differential scanning calorimetry (DSC) of the cured material of 10 mg was performed.

<Evaluation of Strength of Adhesion>

Evaluation of the strength of adhesion of sealants 1 to 6 was carried out by a method described below.

(1) Sample Preparation

Glass substrates 100 and 200 were prepared with alignment films 1 to 4 shown in FIG. 7 formed on a surface of alkali-free glass (AN-100 manufactured by Asahi Glass Co., Ltd.). Polyamic acid in FIG. 7 has a constituent unit shown in chemical formula 15, and polyamic acid ester shown in FIG. 7 has a constituent unit shown in chemical formula 16. Optical alignment indicated in FIG. 7 means that an alignment treatment by irradiation of polarized ultraviolet light (having a dominant wavelength of 254 nm) was carried out. Rubbing indicated in FIG. 7 means that an alignment treatment in which a surface of a polyimide film is rubbed in a predetermined direction by a buff cloth arranged on a rubbing roller was carried out.

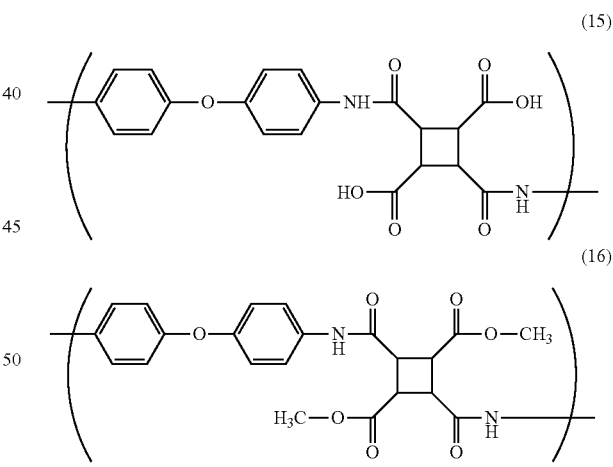

A very small quantity of sealants 1 to 6 was dropped on a bonding plane on which an alignment film of the glass substrate 100 having a size of 40 mm×40 mm is formed, and then a bonding plane on which an alignment film of the glass substrate 200 having a size of 40 mm×35 mm is formed was laid over that bonding plate, thereby spreading sealants 1 to 6 on the entire surface of the glass substrate 200. In this state, ultraviolet light (light source: mercury xenon lamp manufactured by Ushio, Inc.; luminous intensity: 100 mW/cm$^2$; integrated light quantity: 3000 mJ/cm$^2$) was irradiated. After that, heating was conducted for one hour at 120° C. to obtain a sample.

(2) Evaluation

Figure 8A:
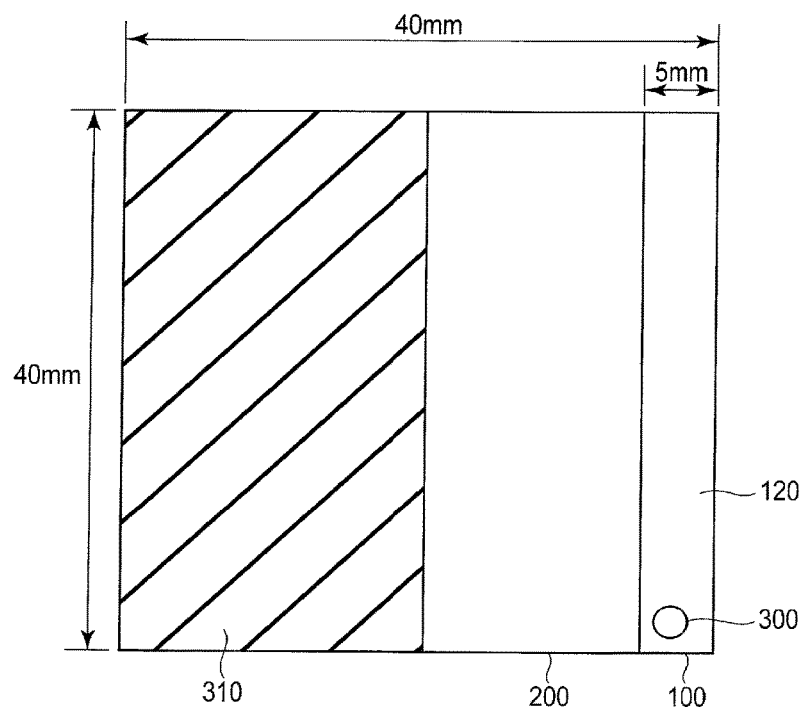
FIG. 8A is a plan view which schematically shows a method of evaluating the embodiment.
Figure 8B:
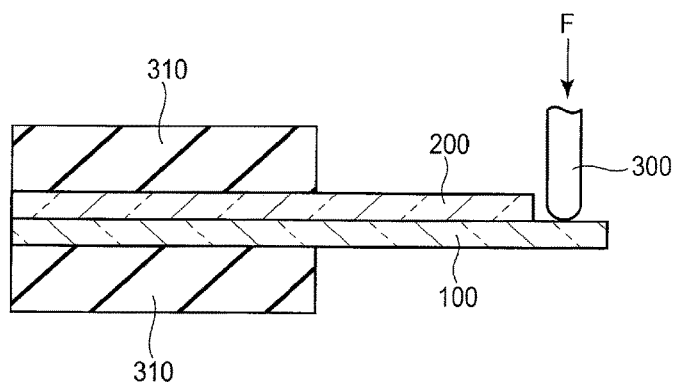
FIG. 8B is a cross-sectional view which schematically shows a method of evaluating the embodiment.

FIGS. 8A and 8B schematically illustrate a method for evaluating the strength of adhesion between the alignment film and the sealant. FIG. 8A is a plan view of the experiment conducted showing how the glass substrate is viewed from a normal direction of the substrate main surface. FIG. 8B is a side view of the experiment conducted showing how the glass substrates are viewed from a direction parallel to the substrate main surface. That is, a sample obtained by the way described in (1) above was fixed by sandwiching it between a holding jig 310. In this state, by applying force on a terminal portion (5 mm×40 mm), which is the area of the glass substrate 100 not opposed to the glass substrate 200, by a pressure pin 300 from the side of the bonding plane, the magnitude of force F when the glass substrate 100 was separated from the glass substrate 200 was measured. The result was evaluated as ◯ when the force F was 30 N or more, Δ when the force F was 20 N or more and less than 30 N, and X when the force F was less than 20 N.

(3) Result of Evaluation

FIG. 9 shows a list of evaluation results. The columns in the table represent the type of alignment films (alignment films 1 to 4) on the bonding plane. The rows in the table represent the type of sealants (sealants 1 to 6) which adhere the alignment films to each other. Each of Examples 1 to 6 represents a combination of a sealant selected from sealants 1 to 3 corresponding to the present embodiment and an optical alignment film. Each of Comparative Examples 1 to 6 represents a combination of a sealant selected from sealants 4 to 6 not corresponding to the present embodiment and an optical alignment film. Note that the type of alignment film in Reference Examples 1 to 12 is the rubbing film. The strength of adhesion of Reference Examples 1 to 12 was ◯, the strength of adhesion of Comparative Examples 1 to 6 was Δ or X, and the strength of adhesion of the present examples was ◯.

From the evaluation results of the reference examples, it has been confirmed that the strength of adhesion is sufficient for any of sealants 1 to 6 when the alignment film is a rubbing film. In contrast, from the evaluation results of the comparative examples and the present examples, it has been confirmed that a sufficient strength of adhesion cannot be obtained unless the sealant is one corresponding to the present embodiment when the alignment film is an optical alignment film.

In view of the foregoing, according to the sealant SE applied to the present embodiment, a good strength of adhesion can be ensured between the substrates even if the sealant is in contact with the optical alignment film.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
a first insulating substrate;
a second insulating substrate disposed at a position opposed to the first insulating substrate;
a liquid crystal layer which is arranged between the first insulating substrate and the second insulating substrate, and includes liquid crystal molecules;
a first alignment film which is formed on the first insulating substrate, and aligns the liquid crystal molecules;
an insulating film which is disposed between the first insulating substrate and the first alignment film, and is in contact with the first alignment film;
a sealant which adheres the first insulating substrate and the second insulating substrate;
an organic insulating film disposed on the second insulating substrate; and
a plurality of spacers which are made of an acrylic resin, extend from the second insulating substrate to the first insulating substrate, and contact with and penetrate the sealant, wherein
the first alignment film is an optical alignment film,
the sealant includes an epoxy resin not having an acrylate skeleton and a resin having an acrylate skeleton,
a storage elastic modulus of the sealant is greater than or equal to $1.0\times10^7$ Pa and less than or equal to $1.5\times10^9$ Pa,
at least a part of the sealant is in contact with the first alignment film, and
at least a part of the first alignment film is disposed between the sealant and the insulating film.

2. The liquid crystal display device of claim 1, wherein the insulating film is an inorganic material layer.

3. The liquid crystal display device of claim 1, wherein:
the first insulting substrate comprises a first long side, a second long side opposed to the first long side, a first short side, and a second short side opposed to the first short side; and
the sealant extending along the first long side, the second long side, and the first short side is in contact with an end portion of the first alignment film and the insulating film exposed from the first alignment film.

4. The liquid crystal display device of claim 3, wherein a signal supply source is disposed on a peripheral area which is positioned along the second short side, and the sealant extending along the second short side is not opposed to the first alignment film.

5. The liquid crystal display device of claim 1, further comprising:
a second alignment film which is formed on the second insulating substrate, and aligns the liquid crystal molecules; and
a projection which extends from the second insulating substrate toward the first insulating substrate, and is provided along an extending direction of the sealant in a planar view, wherein
a distance between an end portion of the first insulting substrate and an end portion of the first alignment film is less than a distance between an end portion of the second insulating substrate and an end portion of the second alignment film in the planar view.

6. The liquid crystal display device of claim 1, wherein the first alignment film includes a polyimide derived from polyamic acid or polyamic acid ester.

7. The liquid crystal display device of claim 1, wherein a photocuring contraction coefficient of the sealant is greater than or equal to 0.1% and less than or equal to 3.8%.

8. The liquid crystal display device of claim 1, wherein a glass transition temperature of the sealant is greater than or equal to 30° C. and less than or equal to 140° C.

9. The liquid crystal display device of claim 1, wherein:
the sealant further comprises a photoradical initiator; and
a content of the photoradical initiator is greater than or equal to 0.1 parts by mass and less than or equal to 10 parts by mass with respect to 100 parts by mass of the resin having the acrylate skeleton.

10. The liquid crystal display device of claim 1, wherein:
the sealant further comprises a thermal polymerization initiator; and
a content of the thermal polymerization initiator is greater than or equal to 1 part by mass and less than or equal to 50 parts by mass with respect to 100 parts by mass of the epoxy resin not having the acrylate skeleton.

11. The liquid crystal display device of claim 1, wherein:
the sealant further comprises a filler; and
a content of the filler is greater than or equal to 3 parts by mass and less than or equal to 40 parts by mass with respect to 100 parts by mass of a total of the resin having the acrylate skeleton and the epoxy resin not having the acrylate skeleton.

12. The liquid crystal display device of claim 11, wherein the filler comprises an organic filler made of an organic material.

13. The liquid crystal display device of claim 1, wherein a distal end of at least one of the spacers is out of contact with the first alignment film.

14. The liquid crystal display device of claim 1, further comprising:
a first organic insulating film made of an organic material, disposed between the first insulating substrate and the insulating film, and having first irregularities on a surface which is in contact with the sealant, wherein:
at least one recess of the first irregularities penetrates the first organic insulating film.

15. The liquid crystal display device of claim 1, wherein:
the spacers are disposed on the organic insulating film.

16. The liquid crystal display device of claim 1, wherein:
a distal end of the at least one of the spacers is in contact with the first alignment film.

17. The liquid crystal display device of claim 1, wherein the spacers have a columnar shape.

* * * * *